United States Patent [19]

Koyama et al.

[11] Patent Number: 4,667,584
[45] Date of Patent: May 26, 1987

[54] COFFEE KETTLE

[75] Inventors: Masahiro Koyama, Kawanishi; Kengi Kinoshita, Osaka; Hiroshi Matsuo, Minoo; Katsuro Okada, Hirakata, all of Japan

[73] Assignee: Matsushita Electric Industrial Co., Ltd., Kadoma, Japan

[21] Appl. No.: 744,487

[22] PCT Filed: Oct. 5, 1984

[86] PCT No.: PCT/JP84/00471

§ 371 Date: Jun. 7, 1985

§ 102(e) Date: Jun. 7, 1985

[87] PCT Pub. No.: WO85/01649

PCT Pub. Date: Apr. 25, 1985

[30] Foreign Application Priority Data

Oct. 11, 1983 [JP] Japan ................................ 58-189725
Dec. 29, 1983 [JP] Japan ................................ 58-246793

[51] Int. Cl.⁴ .................................................. A47J 31/30
[52] U.S. Cl. .................................................. 99/280; 99/293
[58] Field of Search ................ 99/280, 281, 282, 283, 99/293, 299, 302 R, 300, 305; 426/433

[56] References Cited

U.S. PATENT DOCUMENTS

| | | | |
|---|---|---|---|
| 4,143,589 | 3/1979 | Weber | 99/282 |
| 4,169,978 | 10/1979 | Hauslein | 99/281 |
| 4,178,842 | 12/1979 | Vitous | 99/281 |

FOREIGN PATENT DOCUMENTS 56-37484 9/1981 Japan.
57-134125 8/1982 Japan.

*Primary Examiner*—Robert W. Jenkins
*Attorney, Agent, or Firm*—Cushman, Darby & Cushman

[57] ABSTRACT

A coffee kettle of this invention comprises a filter case (8, 80), a water tank (7, 79) having a heater (6, 78), power supply and control means for supplying power to the heater (6, 78), a steam sensing element (52, 128) to operate upon sensing steam generated from water heated to boiling in the water tank (7, 79), wherein hot water in the water tank (7, 79) is supplied to the filter case (8, 80) by operating the hot water supply valve (38, 100) in association with the movement of the steam sensing element (52, 128).

7 Claims, 10 Drawing Figures 4,667,584

COFFEE KETTLE

BACKGROUND OF THE INVENTION

1. Technical Field

This invention relates to a coffee kettle capable of automatic extraction of tasty coffee liquid by dripping boiling hot water onto coffee powder.

2. Description of the Prior Art

Among conventional methods of obtaining coffee liquid by dripping hot water onto coffee powder, are a so-called drip type wherein water is introduced from the bottom part of a water tank to a heated pipe, heated, and raised by the use of steam generated by nucleated boiling, and dripped onto coffee powder for 10 minutes or so, and a drop-supply type wherein an water tank is provided with a heater and a temperature-release valve and hot water is dripped onto coffee powder placed below the water tank.

However, these methods have by such drawbacks that the temperature of the supplied hot water is low in an early stage because of the introduction of cold water mixed therein, a temperature characteristic which is below 86° C. even at the point of time of the end of supply until when water has gradually become hotter than before, difficulty in elimination of fluctuation in temperature sensing accuracy, and, as the result, a temperature of the supplied hot water is indefinite and low, and these methods do not supply boiling hot water of a high temperature. Therefore, these methods cannot satisfy such requirement as "To drip boiling hot water onto coffee powder and, sufficiently swelling coffee powder, complete extraction within 3 to 4 minutes" which is a key to extraction of tasty coffee liquid.

And, in order to obtain tasty coffee liquid full of flavor and rich taste, known is the utilization of a so-called steaming effect, wherein in the process of coffee essence extraction coffee powder is put into a state that makes easy the extraction of coffee essence by providing a length of time for sufficiently swelling the whole coffee powder with hot water of high temperature and then by supplying hot water once more onto the coffee powder to efficiently extract coffee essence; but a matter satisfying requirements for extraction at the above-mentioned high temperature including such constitution has not yet been realized, thereby genuinely flavorful and rich coffee liquid having been unobtainable.

SUMMARY OF THE INVENTION

A coffee kettle according to this invention comprises a filter case for containing coffee powder, a water tank provided with a heater, an electric power supply and control unit for supplying electric power to the heater, a steam sensing element to operate upon sensing steam generated when water in the water tank is heated to boiling, and a hot water supply valve for supplying hot water in the water tank to the filter case by an action of the steam sensing element, and accordingly, since hot water to be supplied on the coffee powder is necessarily caused to become boiling water by the action of the steam sensing element, thereby to make the temperature at which the water contacts the coffee to be high from the first and to cause the length of time for extraction to become complete time within 3 to 4 minutes, and furthermore the whole of the coffee powder is swollen at once by hot water of high temperature so that a steaming effect to make extraction of coffee essence easily becomes expectable.

DETAILED DESCRIPTION OF PREFERRED EMBODIMENTS OF THE INVENTION

Figure 1:
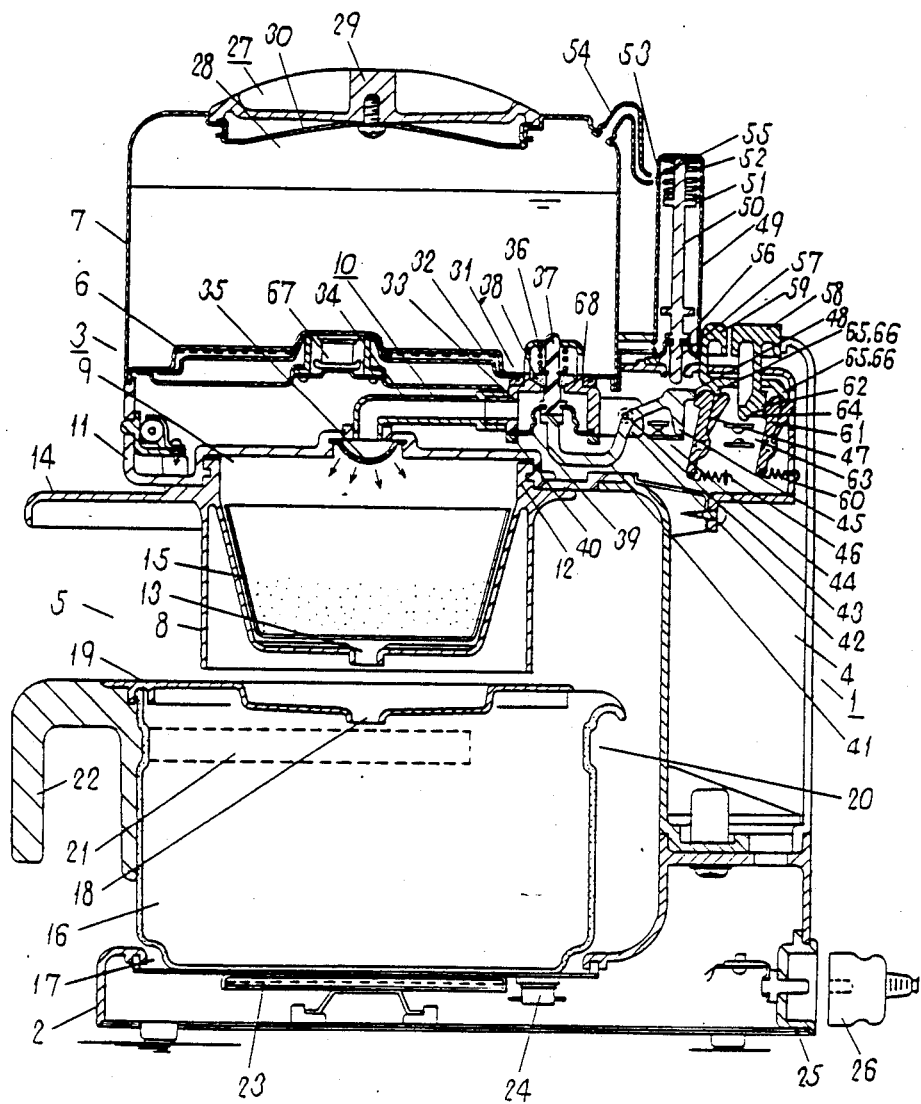
FIG. 1 is a sectional view of a coffee kettle showing one embodiment of this invention.
Figure 2:
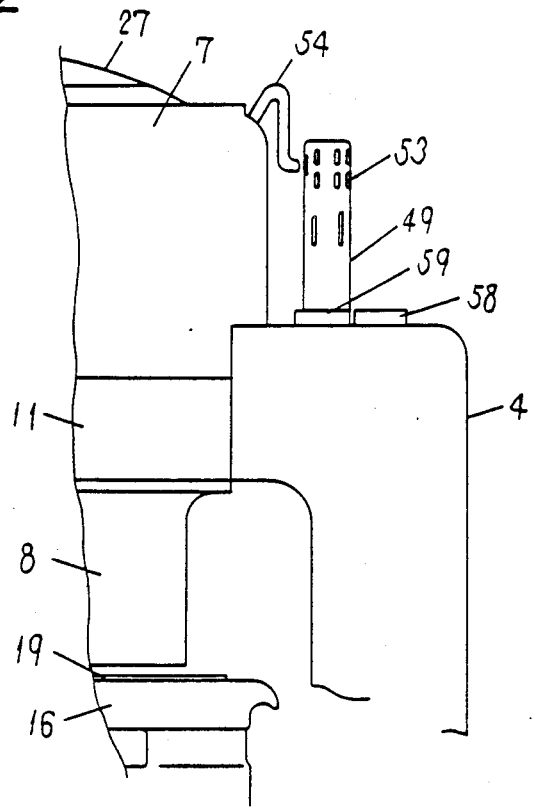
FIG. 2 is a partial front view of a main part thereof.

With reference to the appended drawings, an embodiment of this invention will be described as follows:

In FIG. 1 and FIG. 2, numeral 1 designates the body of a kettle which is composed of a base 2 shaped like a flat cylindrical vessel, a vessel unit 3 positioned above and facing to the base 2, and a pillar 4 to connect the vessel unit 3 to the side of the base 2, the body 1 defining a cup receiving space 5 which is open at the left side and looking like a 90°-turned U letter.

The vessel unit 3 comprises, in the upper position a cylindrical water tank 7 made of stainless steel and having a heater 6 for heating water fixed to the bottom thereof and in the lower position a vessel frame 11 having a recessed fitting surface 9 into which a filter case 8 is detachably fitted from the side of a cup receiving space 5 lying and internally having hot water supply means 10 for introducing water in the water tank 7 to the area above the filter case 8 and electrical component parts and so on. The filter case 8 is provided with an upper projecting surface 12 so as to be fitted into the above-said recessed surface 9 through a bayonet joint or sliding rails, an extraction port 13 at the bottom, and a handle 14 at the top of the side thereof, and also contains a paper filter 15 into which coffee powder is put. Numeral 16 designates a glass cup which is positioned below the filter case 8 and has its underside removably placed on the cup receiving part 17 on the upper surface of the base 2, and the glass cup 16 is provided with a lid 19 covering its upper open part and having a liquid receiving port 18 facing the extraction port 13 of the filter case and with a handle 22 to be fixed to an annular recessed surface 20 of the cup 16 by means of a fixing piece 21 by utilizing elasticity of resin material or the like.

Numeral 23 designates a cup warming heater provided in the base 2 of the cup receiving part 17. Numeral 24 designates a thermostat for temperature control over the cup warming heater, and numeral 25 designates a magnet plug receiving peg frame provided on the lower part of the pillar 4.

Numeral 27 designates a lid detachably fixed to the upper water supply port 28 of the water tank 7 by projection-recess engagement with the tank, and integrally composed of an upper knob part 29 made of resin and a lower covering lid 30 made of stainless steel.

The above-mentioned hot water supply means 10 comprises a hot water supply port 31 on the bottom of the water tank 7, a valve case 33 fixed to this hot water supply port 31 through a waterproof packing 32 in such manner that a part thereof protrudes into the water tank 7, a hot water supply pipe 34 for introducing hot water in the valve case 33 toward the upper part of the filter case 8, and a detachable diffuser 35 made of stainless steel for evenly dispersing hot water onto coffee powder.

Numeral 36 designates a valve spring for energizing from the upper side a hot water supply valve 38 fixed to a vertically movable valve spindle 37 for adapting the hot water supply valve 38 to close an opening all the time, and 39 designates a diaphragm for retaining the lower part of the valve spindle 37 at the center thereof and to be fixed to a valve case cover 40 at the periphery, the diaphragm 39 being made of silicon rubber, vertically movable, and water-tightly retained at the fixing part thereof.

Numeral 41 designates a valve lever which is fixed to a pair of supporting pieces 42 protrudingly provided from the valve case 33 and turns around its fixed part 43 as a fulcrum, the left end of the lever 41 is adapted to abut on the bottom end of the valve spindle 7 and the right end being provided with a projection 45 for changing over a normal-off contact 44 as a switching element for supplying power to the heater 6 and with a catching part 48 in contact with a catching lever 47.

Numeral 49 designates a steam sensing cylindrical tube of stainless disposed in parallel with the water tank 7 and protruding above the pillar 4, and the steam sensing cylindrical tube 49 has a vertically sliding rod 50 and a steam sensing element 52 which is located in the upper interior of the tube and between the upper surface of this tube 49 and the flange 51 of the sliding rod 50, composed of a coiled-spring-like shape-memory alloy made of Ti-Ni alloy or Cu-Zn alloy treated so as to elongate for restoring to the initial state which the alloy has memorized at a temperature below 100° C. The steam sensing tube 49 positioned outside the steam sensing element 52 is provided with steam ports 53 by which the inner space of the tube is adapted to communicate with the outer space, and, opposite to one of these ports 53 an opening 55 of a steam pipe 54 having one end caulked (i.e. squeeze-formed, e.g. crimped) to a part of the water tank higher than the specified level of water in the water tank 7 and also having its mid-portion raised higher than the upper surface of the water tank 7 is disposed. The steam sensing tube 49 is provided with a peripheral part at the lower end and positionally fixed by a vertically movable water-tight packing 56 supporting the sliding rod 50 within the tube so as to be water-tightly separated from the pillar 4. However, only an acting part 57 of the sliding rod 50 which downwardly extends beyond and lower than the water-tight packing 56 is adapted to face the upper surface of the catching part 48 of the valve lever 41 in the pillar 4.

Numerals 58 and 59 designate a push-button power switch provided protruding from the upper surface of the pillar 4 and another push-button turn-off switch for releasing the suspension of operation progress, respectively, the former having a lower end formed into two parts such as a catching piece 62 for catching a switch lever 61 energized by a spring 60 and a projecting part 64 for closing a power source line switch 63 lying below when the catching piece catches the switch lever, and being so arranged as to return upward by the spring force when released from the operator's hand.

The push-button 59 is also an automatic return type operation switch energized normally upward by a spring (not shown) and provided with, at the lower end, releasing pieces 65 and 66 lying near the switch lever 61 and a catching lever 47 for operating the above-said valve so as to release catching engagement of the switch lever 61 and of the catching lever 47.

Figure 3:
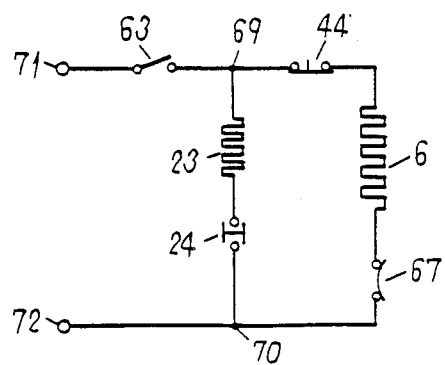
FIG. 3 is an electric circuit diagram therefor.

FIG. 3 shows an electric circuit diagram, wherein numerals 71 and 72 designate power source terminals connected to a power source, for example, 100 V, and corresponding to a magnet plug 26 shown in FIG. 1. The numeral 63 designates a power source switch to which a series circuit including a warming heater 23 and a temperature control thermostat 24 and another series circuit including the heater 6 for boiling water connected to a normal-off contact 44 as a switch element and to a safety thermostat (indicated as 67 in FIG. 1) for preventing burning of empty tank are connected to the power source terminal 72 through common connection points 69 and 70.

The action of the above-said structure will be described. First, the filter case 8 containing coffee powder and the paper filter 15 is fixed to the recessed fitting surface 9 and, on the other hand, the water tank 7 is fed with a predetermined quantity of water (usually water for about four servings) and covered with the lid 27. When the cup 16 is placed on the cup receiving part 17 in the receiving space 5, the liquid receiving port 18 of the lid 19 for the extraction port 13 of the filter case 8 cup faces. With the magnet plug 26 connected to the peg frame 25 of the base 2 and the push-button power switch 58 depressed, the power source line switch 63 is closed, thereby the cup warming heater 23 and the heater 6 for boiling water being electrified.

And, water in the water tank 7 is heated by the heater 6 to raise temperature to such an extent to emit faint steam from the surface thereof at a temperature near 100° C., and, when heated to the boiling point of 100° C., it becomes forceful steam, and that it is emitted incessantly. Steam emitting at the boiling point is as forceful as flushing from small slits on the water tank 7. Such forceful steam, as a matter of course, spouts from the opening 55 after passing through a steam pipe 54 provided on the upper part of the water tank 7 and, further, instantaneously spouts onto the coiled-spring-like steam sensing element 52 made of the shape memory alloy through the steam ports 53 provided for the steam sensing tube 49.

Then, the steam sensing element 52 is subjected to an abrupt temperature rise as changing from an ambient temperature of about 30° C. to 100° C., whereby the coiled-spring-like element that has memorized the shape thereof at a temperature lower than 100° C., for example, 80° C. or so, quickly elongates due to a strong restitutive force thereof.

The movement of the steam sensing element 52 depresses the sliding rod 50 and the acting part 57 at the lower end of the rod pushes the upper surface of the catching part 48 of the valve lever 41, when the acting force in opposition to the energizing force of the valve spring 36 and another spring 46 adapts the catching part 48 to turn for catching and locking the hook of the catching lever 47. At this time, the projection 45 of the valve lever 41 depresses and opens a movable piece of normal-off contact 44 as a switch for supplying power to the heater 6 so as to stop electrification of the heater 6 and prevent further heating of water. Also, in the above movement, the left end of the valve lever 41 pushes upward the valve spindle 37 via vertically movable diaphragm 39, thereby opening the hot water supply valve 38.

When the hot water supply valve 38 is opened, hot water in the water tank 7 is, after passing through an opening 68, valve case 33, and hot water supply pipe 34, evenly poured onto coffee powder being diffused from perforations of the diffuser 35. Then, the hot water efficiently extracts coffee essence, is filtered by the paper filter 15 to turn into clear coffee liquid, and then is contained in the cup 16 after passing through the extraction port 13 on the bottom of the filter case 8 and the liquid receiving port 18 of the cup lid 19 lying below and opposite to the filter case bottom. On the other hand, coffee liquid in the cup 16 is kept warm at an appropriate temperature by the cup warming heater 23 controlled by the thermostat 24.

Depressing of the push-button turn-off switch 59 after the use of coffee kettle operates releasing pieces 65 and 66 in such a way to release the switch lever 61 and the catching lever 47 from catching engagement with respective partner parts in opposition to springs 60 and 46 of the switch lever 61 and the catching lever 47, respectively, whereby the push-button power switch 58 and the push-button turn-off button 59 automatically return upward to initial positions thereof by the spring force and the normal-off contacts 44 closes the circuit that has been in the open state. At the same time, the power source line switch 63 is turned off and electrification of the heater 6 and the warming heater 23 is suspended to disconnect the circuit.

In response to the return of the push-button turn-off switch 59, the force of the valve spring 36 acts upon the steam sensing element 52 via the valve spindle 37, valve lever 41, and sliding rod 50, when, however, steam has stopped spouting and the shape memory effect has passed away. Therefore, the steam sensing element 52 is easily returned from the shape of the elongated coiled spring to the initial contracted state to close the hot water supply valve 38, thereby dripping of water does not takes place even when water is poured into the water tank again. Further, the push-button turn-off button 59 possesses a so-called releasing function capable of suspending or releasing the performance, such that, when in midway of heating and supplying of hot water such actions are desired to be suspended halfway through the operation, by operating it the catching and locking performance that has put the power source line switch 63 and the hot water supply valve 38 into open state can be released.

For the purpose of assuring exact performance of releasing as above, in an embodiment of this invention, the shape memorizing temperature as well as the shape and the number of steam ports 53 outside the steam sensing element 52 provided in the steam sensing tube 49 are designed to be effective so that the shape memory effect of the steam sensing element 52 may rapidly pass away, particularly, at the time of hot water supply immediately after a steam sensing.

A length of time between pouring of hot water from the water tank 7 onto coffee powder and extraction of coffee essence is set at about 3 to 4 minutes responding to the diameter of the hot water supply pipe 34 and the length of displacement of the hot water supply valve 38.

Therefore, hot water is poured onto coffee powder after once boiled and released from heating, and thereby it is as hot as 96° C. in temperature at the beginning of pouring even though losing heat during passing through the hot water supply passage and the like, and, though the temperature gradually is lowered, it is kept at 90° C. or above ideally for extraction even at the time of completion of extraction.

In this way, an embodiment of this invention is of such structure that hot water is supplied for coffee essence extraction in association with the movement of the shape memory alloy as a steam sensing element 52 which operates upon sensing steam generated from heating to the boiling point of water contained in the water tank 7, and therefore, capable of almost satisfying such conditions as "To drip boiling hot water onto coffee powder and complete extraction of coffee within a period of 3 to 4 minutes" which is a key to extract tasty coffee liquid, and enabling efficient extraction of coffee essence under ideal conditions for providing genuinely flavorful and rich coffee liquid.

Since supply of hot water for extraction is started after sensing boiling of water, the water temperature for extraction is free from fluctuation depending on number of cups for serving, enabling drinking invariably and stably tasty coffee liquid at any time desired, and, in addition, fluctuation in power consumption and in additional voltage in the heater 6, time lag in temperature sensing between the sensing part and switch part as observed in the conventional device employing a thermostat as a water temperature sensing member, and fluctuation in sensing in accordance with the setting position of the part are all completely eliminated, thereby enabling to possess a high level reliability and hence markedly improved its commercial value. When the shape memory alloy as a steam sensing element 52 as in this embodiment is adopted, two functions as steam sensing and mechanical operation can be possessed simultaneously, and, as a result, not only the structure is simplified but also time lag in operation is eliminated, and it becomes small in size, light in weight, and low in price. Besides, use in the steam sensing being the performance of sensing of quick change between the normal temperature of water to the boiling point, it is possible to allow a setting of a shape memory temperature to have a range and eliminate sensing error caused by fluctuant temperature, and thereby high reliability and reduced production cost become further possible.

As in an embodiment of this invention, when steam sensing is performed outside the water tank 7, even for such a structure as employing a water tank 7 made of stainless steel wherein sufficient confirmation of coffee extraction process is impossible, such evaluation of the commercial product that a process of coffee extraction can be enjoyed by visual confirmation of a state as steam spouting. Therefore, employment of a stainless steel water tank 7 enables the use of hot water of nearly 100° C., contrary to the conventional plastic tank limited to the use of cold water only, and makes easy handling, and eliminates unfavorable influence as smell of plastics upon extraction of coffee essence.

Since the configuration is such that diselectrification is made by opening the switch element 44 closing the circuit of the heater 6 in association with the movement of the steam sensing element 52, prevention of burning of the water tank 7 after the end of hot water supply becomes possible, and such action can be made automatically, leading to excellent safety and operability.

As regards the above embodiment, a description has been made on the structure in which the steam sensing element 52 made of the shape memory alloy is shaped like a coiled-spring and disposed upright outside the water tank 7; however, it is a matter of course that configuration is not limited to the above-mentioned one and may be appropriately modified to be embodied without departing from the scope of the concept, for example, a sensing element shaped straight, and disposed in the water tank may be possible.

In the above embodiment, although the valve lever 41 is brought into catching engagement with the catching lever 47 for enabling continuous locking, such catching engagement may be adapted to continue for a predetermined time (e.g. 3 to 4 minutes before completion of hot water supplying) and be provided with a time limiting element for releasing the engagement and restoring the initial conditions.

Further, in the above-mentioned embodiment, the description was made on the method of releasing the operation by means of the push-button turn-off switch 59, however, a structure capable of opening the valve in association with the application of the lid 27 or the filter case 8 to the kettle may suffice.

Now, another embodiment shown in FIGS. 4 through 7 will be described. In these drawings, numeral 73 designates a body of a kettle composed of a base 74, a vessel unit 75 positioned above the base 74, and a pillar 76 connecting the vessel unit 75 with the side of the base 74. A receiving space 77 is provided on the left side of the pillar 74 on the drawing. The vessel unit 75 is composed of a water tank 79 made of stainless steel and having a heater 78 fixed to the bottom thereof, a recessed fitting surface 81 into which a filter case 80 is detachably fitted, and a vessel frame 83 internally containing hot water supply means 82 for upwardly guiding water in the water tank 79 toward the area above the filter case 80 and other electrical wiring parts. The filter case 80 is provided with an upper projecting surface 84 to be fitted into the above-said recessed surface 81 through the bayonet joint or sliding rails, an extraction port 85 at the bottom and a handle 86, and also contains a paper filter 87 into which coffee powder is put. Numeral 88 designates a cup which is positioned below the filter case 80 and removably placed on the cup receiving part 89 above the base 74 and is provided with a cup lid 91 having a liquid receiving port 90 facing the extraction port 85 of the filter case 80 and a handle 92 for holding.

Numeral 93 designates a warming heater for cup warming provided in the base 74 of the cup receiving part 89, numeral 94 designates a thermostat for temperature control and numeral 95 designates a lid of the water tank fixed on the upper water supply port 96 of the water tank 79. The above-mentioned hot water supply means 82 comprises a hot water supply port 97 provided on the bottom of the water tank 79, a valve case 99 fixed to this hot water supply port 97 through a water proof packing 98 in such manner that a part thereof protrudes into the water tank 79, a hot water supply pipe 101 for upwardly introducing hot water from the valve case 99 to the area above the filter case 80 through a hot water supply valve 100 and a diffuser having a function to evenly dispersing hot water onto coffee powder.

In the valve case 99, further provided are a valve spring 103 acting to close the hot water supply valve 100 all the time in an upper position, and in a lower position a diaphragm 105 made of a silicone resin and fixed to the valve case 99 at the periphery by means of a valve case cover 104 and shaped to be vertically movable at the central part thereof for opening the valve.

Numeral 106 designates a turnable valve lever mounted on a supporting plate 107 by a fulcrum 108 is provided with a left arm 109 positioned on the left side thereof and close to the lower end of the diaphragm 105 and, on the right side a projection 111 for closing a power supply switch 110 to supply power to the heater 78 when the valve is closed, an engaging surface 113 abutting on the lower end of a sliding rod 112, and a catching piece 117 so arranged as to hook the catching lever 116 energized by a spring 115 through the lower part of a sliding plate 114 and then locked.

The sliding plate 114 is configured in such a shape to be vertically movable by the turn of a link shaft 119 having a fulcrum 118 through the upper end thereof having a catching part 120, and, at ordinary times it is positioned low in engagement with a stopper 121 and positionally controlled low thereby. Numeral 122 designates an engaging lever having a catching piece 124 energized by a spring 123 so as to engage with the upper end catching part 120 of the sliding plate 114 when this plate 114 is raised.

The upper end of the sliding rod 112 is vertically movably arranged and supported within a roughly cylindrical steam sensing tube 126 protrusively disposed in parallel with the water tank 79 and fixed to the supporting cover 125. Also, at the upper end of the sliding rod 112 and between the inner surface of the steam sensing tube 126 and the flange 127 of the sliding rod, there is provided a coiled-spring-like steam sensing element 128 made of a shape memory alloy such as Ti-Ni alloy or Cu-Zn alloy and treated to elongate to the initial length memorized at a predetermined temperature lower than 100° C. Numeral 129 designates steam ports provided on the upper part of the steam sensing tube 126 for adapting the steam sensing element 128 to communicate with the atmosphere and, against one of these ports, disposed is an opening at one end of the steam pipe 130 having the other end fixed to a point above the specified level of water in the water tank 79. Numeral 131 is a water-tight packing which vertically movably supports the lower part of the sliding rod 112 at the center thereof so that the steam sensing tube 126 communicating with the atmosphere may water-tightly be separated from the interior of the vessel, the peripheral part thereof being fixed to the fixing plate 132 and the underside of the support cover 125. Numerals 133 and 134 designate operation push-buttons whose upper portions protrude from the upper operation part 135 of the support cover 125, and one of them 133 a power switch button which is brought into contact with a catching piece 138 to catch a switch lever 137 energized by a spring 136 and with a moving contact of the power switch 139 and has a projection 140 which acts to close the power source line switch and is arranged to upwardly return to the initial position by the force of a spring not shown. The other operation push-button 134 is a turn-off push-button arranged to normally upwardly return to the initial position by a spring not shown, and, at the lower end thereof, there are provided releasing pieces 141, 142 and 143 which are disposed near the switch lever 137, catching lever 116, and engaging lever 122 and act to release these levers from catching engagement in opposition to the force of springs 136, 115 and 123 of these levers 137, 116 and 122, respectively. Numeral 144 is a peg frame for a magnet plug 145 provided on the side of the pillar 76 of the base 74.

Figure 7:
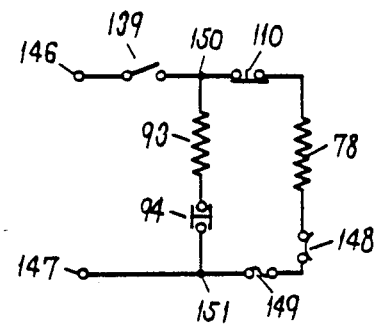
FIG. 7 is an electric circuit diagram for the second embodiment.

Next, with reference to FIG. 7, an electric circuit will be elucidated. Numerals 146 and 147 designate power source terminals connected to the power source of, for example, 100 V and correspond to both terminals in the peg frame 144 shown in FIG. 4. At one end of the power source terminal 146, through a power switch 139 and to the other power source terminal 147 a series circuit of the cup warming heater 93 and temperature control thermostat 99, and another series circuit of the power supply switch 110, the heater 78, the safety thermostat (148 in the drawing) for preventing burning of the empty water tank, and the temperature fuse 149 (not shown) are parallelly connected across common connection points 150 and 151.

The action of the above-mentioned configuration will be described. Water in the water tank 79 is heated by the heater 78 to be high in temperature and, when reaching the boiling point of 100° C., forcefully spouts in the form of steam from the steam pipe 130 provided on the top of the water tank 79. Spouting steam instantaneously pours onto the steam sensing element 128 made of the shape memory alloy through the steam ports 129 of the steam sensing tube 126, when the coiled-spring-like steam sensing element 128 subjected to severe change of temperature from 30° C. or so as an ambient temperature to 100° C. quickly elongates to restore the initial shape thereof memorized at a temperature lower than 100° C., for example, 80° C. or so, due to a strong restitutive force.

The aforementioned movement depresses the sliding rod 112 through the flange 127, whereby the engaging surface 113 is depressed and operates to turn the valve lever 106 clockwise. Thus, the power switch 110 is opened, and the circuit to the heater 78 is also opened to suspend power supply, and heating of water in the water tank 79 is stopped. At the same time, the lower end of the sliding plate 114 pushed by the catching lever 116 energized by the spring 115 rides on the hook part of the catching piece 117 turned as described above, but the catching lever 116 can not engage with the catching piece 117 because of the sliding plate 114 and can not control the movement of the valve lever 106 (Refer to the part drawn with an alternate long and short dash line in FIG. 5). Elongation of the steam sensing element 128 keeps the valve lever 106 depressed until when steam generated from water heated by the heater 78 spouts out, the power supply switch 110 is opened by turning of the valve lever 106 for suspending power supply to the heater 78 and spouting of steam, and restitutive force of the steam sensing element 128 acting at a memorized temperature passes away with the fall of the temperature of the element.

On the other hand, the turning movement of an arm 109 on the left side of the valve lever 106 pushes upward and opens the valve 100 energized by the spring 103 through the diaphragm 105. In this case, the restitutive force of the steam sensing element 128 made of the shape memory alloy that has been subjected to shape memory treatment is set stronger than the force of the valve spring 103 for opening the valve 100. When the valve 100 is opened, boiling hot water in the water tank 79 is poured onto coffee powder in the filter case 80 through perforations of the diffuser 102 after passing through the hot water supply port 97, valve case 99, and hot water supply pipe 101. A quantity of hot water poured at this time corresponds to that prepared for the first supply to be evenly poured onto coffee powder, enough for fully swelling coffee powder, and effective for extraction of coffee essence performed by the second supply of hot water.

When the sliding rod 112 closes the hot water supply valve 100 by the valve closing force thereof in association with the counterclockwise turn of the valve lever 106 after the stop of steam spouting and consequent extinction of restitutive force of the steam sensing element 128, the sliding rod 112 is pushed upward and therefore the steam sensing element 128 restores the initial contracted state thereof. At this time, the lower end of the sliding plate 114 riding on the hook part of the catching piece 117, due to counterclockwise turn of the valve lever 106, raises the sliding plate 114, accompanied by the turn of the upper end of the link shaft 119. As a result, the upper catching end 120 of the sliding plate 114 engages with the catching piece 124 of the lever 122 and the sliding plate 114 is caught to be high in position.

Upon closing of the hot water supply valve 100, the supply of hot water to coffee powder is stopped and also the power supply switch 110 is closed by the projection 111 of the valve lever 106, whereby the heater 78 is electrified and water in the water tank 79 is again heated. Not a very long time is needed to re-boil water which has been once boiled.

When steam again spouts from the steam pipe 130 to the steam sensing element 128, the valve lever 106 again turns clockwise with the sliding rod 112 depressed by elongation of the steam sensing element 128. Then, the power supply switch 110 is opened and power supply to the heater 78 is stopped, thereby heating of water in the water tank 79 being stopped. At the same time, the catching piece 117 is also depressed but the sliding plate 114 is kept high in position due to engagement thereof with the catching lever 122, and the catching lever 116 easily catches the hook part of the catching piece 117 by the force of the spring 115. Such catching engagement is maintained preventing the counterclockwise return of the valve lever 106 even when steam stops spouting thereafter.

Then, the hot water supply valve 100 is opened by the arm 109 on the left side of the valve lever 106 and hot water is again poured onto coffee powder. The time to suspend the hot water supply after the first hot water supply and before the second hot water supply is the so-called "steaming time", and is usually, 30 seconds or so.

Referring to FIG. 3, such states as above will further be described: The steam sensing element 128 elongates, opens the valve, and turns off the current in the heater 78 (at the point A) at the temperature of steam of 100° C.; steam generated by heating of water, however, continues to spout thereafter for a certain period of time (from point of time A to that of a); after the cease of steam spouting, the steam sensing element 128 loses restitutive force thereof by the force of closing the hot water supply valve 100 and restores the initial contracted coiled-spring-like shape while cooled (the time from a to B); during the total length of time (A to B), the valve is opened for the first supply of hot water; then the valve is continuously closed for the time (B to C) until steam spouts due to re-heating and elongates the steam sensing element 128; and, after the end (the point C) of steaming time during which the valve is closed and hot water supply is suspended, the valve is continuously opened and turns off the current in the heater 78 without operating in association with the movement of the steam sensing element 128.

That is, by controlling the power supply switch 110 so as to make repeated operation, the valve lever 106, sliding plate 114, catching lever 116, link shaft 119, and sliding rod 112 can control the action of the hot water supply valve 110 so as to make automatic processing of such steps of operation as the first supply of hot water→steaming→the second supply of hot water, by utilizing the shape memory effect of the steam sensing element 128.

Since, in the first time supply of hot water, hot water has been evenly poured onto the whole of coffee powder and coffee powder has been fully swollen during the steaming time thereby providing such state that coffee essence is easily extracted, in hot water supplying of a second and subsequent time, rich and flavorful tasty coffee essence is effectively extracted and coffee liquid is filtered by the paper filter 87, passed through the extraction port 85 on the bottom of the filter case 80 and the liquid receiving port 90 of the cup lid, and becomes contained in the cup 88. Coffee liquid contained in the cup 88 is kept warm at an appropriate degree of temperature by the cup warming heater 93 and the temperature control thermostat 94.

Figure 4:
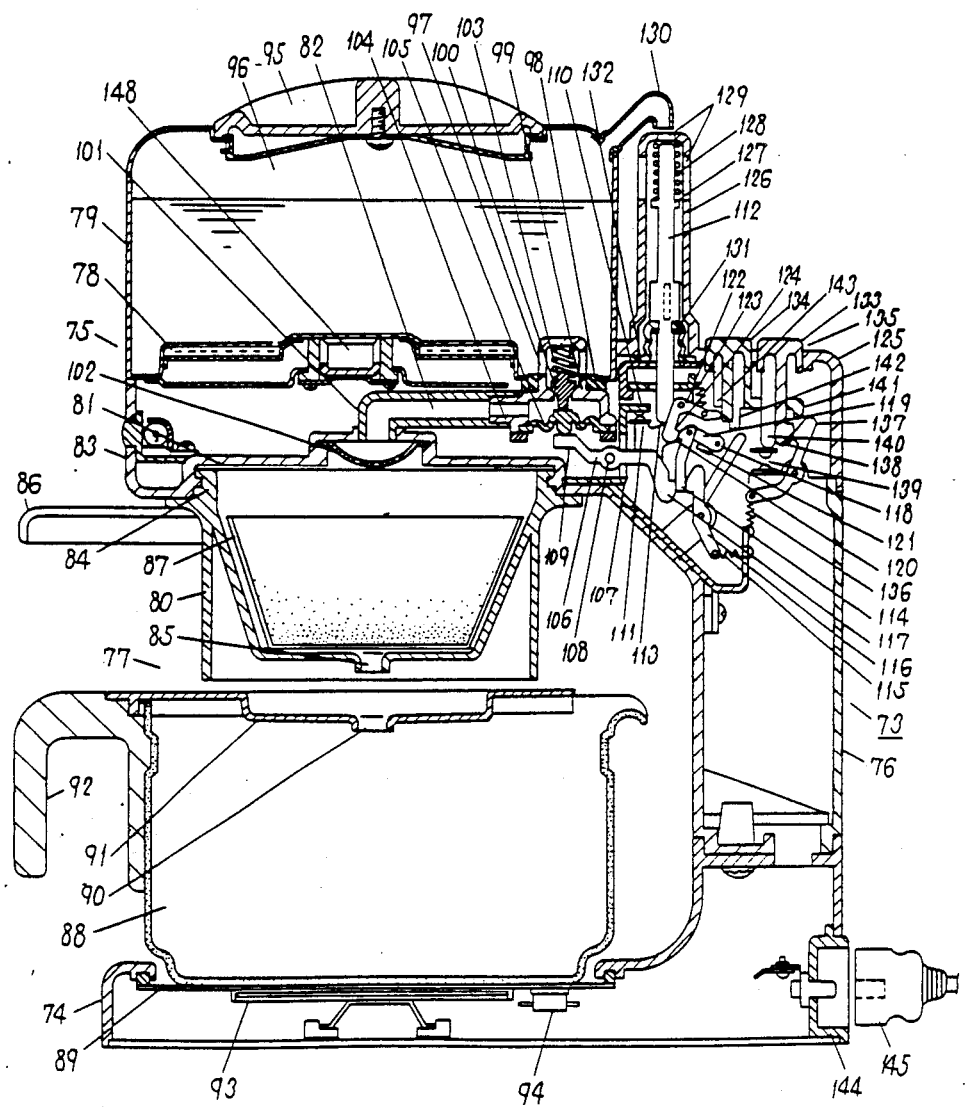
FIG. 4 is a sectional view of a coffee kettle showing another embodiment of this invention.
Figure 5:
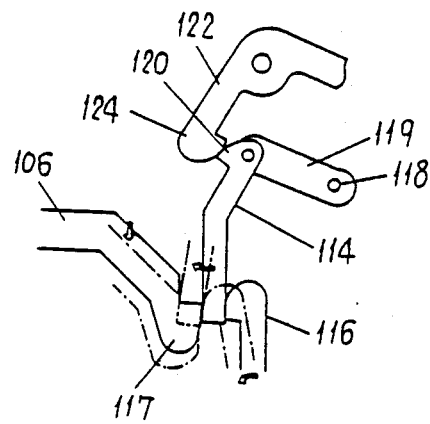
FIG. 5 is an enlarged partial view of a main part thereof.
Figure 6:
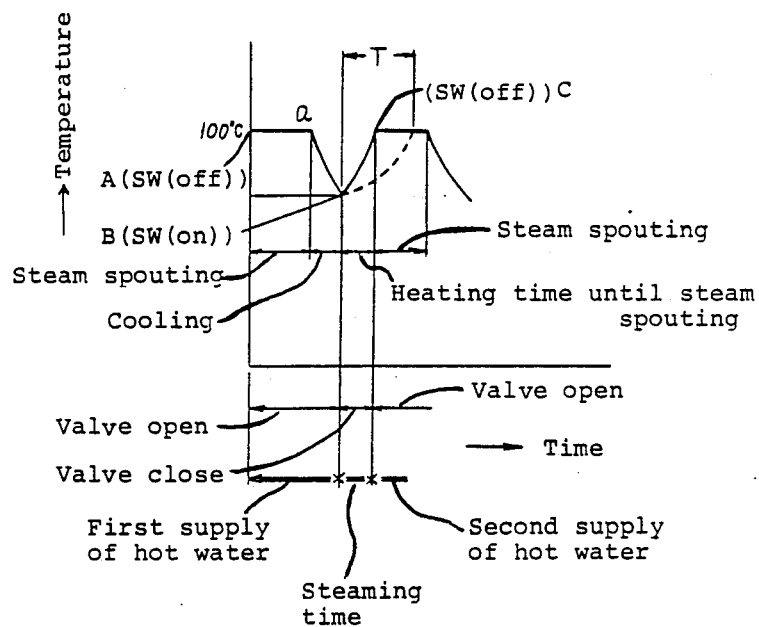
FIG. 6 is a diagram showing the relation between the temperature curve of the steam sensing element and states of a power supply switch and a hot water supply valve.

With depressing of the turn-off push-button switch 134 after the use of the kettle, releasing pieces 141, 142 and 143 provided below the push-button operate to release catching engagement of levers (switch lever 137, catching lever 116 and engaging lever 122) and the power switch 139 is opened whereas the power supply switch 110 is closed, and the sliding plate 114 is moved downward with the movement of the engaging lever 122 and kept as it is, thereby the initial state in which the valve is closed as shown in FIG. 4 being restored. The heater 78 and the cup warming heater 93 as circuitry are turned off and both operation push-button switches 133 and 134 automatically upwardly return to the initial positions while energized by the spring force. A length of time between pouring of hot water supplied from the water tank 79 onto coffee powder and completing extraction of coffee essence for serving of coffee liquid is set at 3 to 4 minutes according to the diameter of the hot water supply pipe 101 and the length of displacement of the hot water supply valve 100 at the time of opening.

Thus, a coffee kettle of this embodiment comprises a filter case 80 for containing coffee powder and a water tank 79 having a heater 78 therewithin, a power supply and control unit (power supply switch 110, valve lever 106, sliding plate 114, catching lever 116, link shaft 119 and sliding rod 112) for the heater 78, a steam sensing element 128 made of the shape memory alloy operating upon sensing steam generated from water in the water tank 79, and a hot water supply valve 100 to supply water in the water tank 79 to the filter case 80 in association with the movement of the steam sensing element 128; and the hot water supply valve 100 is of such structure that the supply of hot water is once suspended by the action of steam repeatedly spouted and is again performed under control of the power supply and control unit of the heater 78; wherein a requirement as "To drip boiling water of high temperature onto coffee powder in the first stage and, swelling coffee powder to the full, complete extraction of coffee essence within 3 to 4 minutes" is satisfied and a process "to steam the whole of coffee powder with hot water of high temperature thereby enabling to provide a state in which coffee essence is readily extracted as a key to serving of flavorful and rich coffee liquid" is made possible, thereby taste of served coffee liquid being further improved.

Because of the use of boiling water for coffee extraction, even hard water is softened and tasty water as a requirement for serving of tasty coffee liquid is available, thereby bad smell of chlorinated lime being removed so as not to degrade the taste of coffee liquid.

In addition, steaming effect is obtained through a structure utilizing generation of steam controlled by electrification of the power supply switch 110, and accordingly, a complicated mechanical timer requiring electric wiring is not used, which leads to simpleness of structure, compactness, lightness in weight, and low cost in production thereof.

Figure 8:
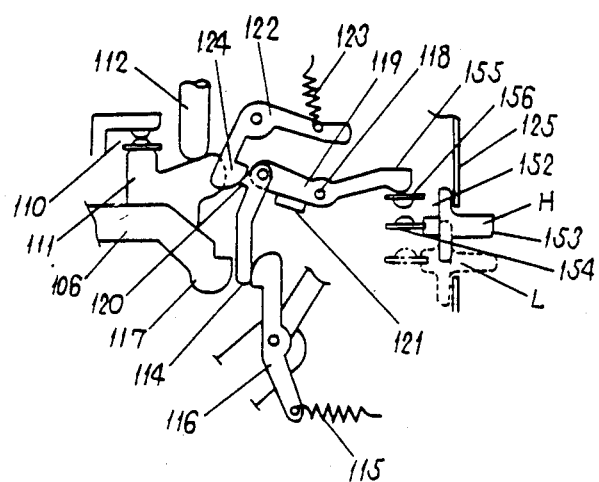
FIG. 8 is an enlarged partial view of a main part of a coffee kettle of a still another embodiment of this invention, and, FIG. 9 and FIG. 10 are electric circuit diagrams therefor.
Figure 9:
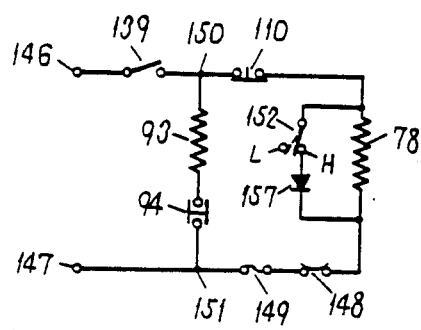
Figure 10:
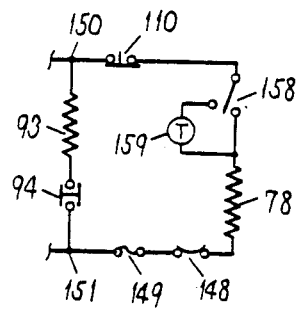

FIGS. 8 through 10 show still another embodiment of this invention in which a power supply and control unit is further improved, and, while applying the same reference numerals to the same parts as those in the previous embodiments and omitting the description thereon, only different parts will be described as follows:

Numeral 152 indicates a changeover switch which is operable from outside as the operator desires and provided with a movable contact 154 positionally controllable in the vertical direction (upper position H, lower position L) in association with the movement of a changeover knob 153 and another movable contact 156 moving downward in association with the movement of a turning piece 155 disposed on the link shaft 119. This changeover switch 152 is, as shown in the circuit diagram in FIG. 9, connected to a diode 157 not shown in FIG. 8 and also to the heater 78 in series.

Then, the action of the above will be elucidated.

When setting the changeover knob 15 in the upper position H, after the first supply of hot water, steam stops spouting and the valve lever 106 turns counterclockwise to raise the sliding plate 114 and also turn the link shaft 119, thereby closing the power supply switch 110 and electrifying the heater 78, however, the movable contact 156 of the changeover switch 152 is depressed by the turning piece 155 integral with the link shaft 119 and, therefore, the changeover switch 152 and the circuit of the diode 157 are connected in series with the heater 78. Accordingly, a heat quantity applied to water in the water tank 79 is halved by the circuit of the diode 157 and the heating time (the time T in FIG. 6) is prolonged. On the contrary, when the changeover knob 153 is set in the lower position L, even when the movable contact 156 is depressed by the turning piece 155, the changeover switch 152 is not closed and heat quantity for heating water in the water tank 79 by the heater 78 is not halved in the same way as that in the previously described embodiment. That is, the apparatus is so configurated as to permit free change of steaming time which is the time for closing the valve after the first supply of hot water and steaming effect can be utilized for a longer time when desired, thereby more enjoyment of rich taste of coffee being possible for the user. This means that the steaming time is variable responding to the quantity of coffee to be served and a combination of steaming effects is possible, for example, a short steaming time for a small quantity of coffee and a long time for the specified quantity or a long time for even a small quantity whereas a short time for the specified quantity.

Moreover, as shown in FIG. 10, by providing a changeover switch 158 in the circuit including the heater 78 and connecting the normal-use contact of this switch 158 to the heater 78 through a timer 159 having the time limiting element, the steaming time can be adjusted by stepless adjustment of starting time of electrification of the heater 78 and the above-said steaming effect may be improved in wider range.

In this way, from this embodiment, the same effect as those of the previously described embodiments can be obtained and such an effect as permitting the user to enjoy wide varieties of steaming effect by operating the knob can be expected.

In the above-said embodiments, a number of levers are used as power supply and control means; but, not being limited thereto, for example, such a structure that control of steam generation in the first stage is made to be in association with electric circuit having a time-limiting element or bimetal may be used.

The steaming time may be divided into several short ones during the supply of hot water and varieties of the steaming effect can be widened by varying the arrangement of the sliding plate 114 and employing an element for repeat of the process of hot water supply-and-suspension in the timer shown in FIG. 10.

Though the steam sensing elements 52 and 128 made of the shape memory alloy were elucidated in the above-mentioned embodiments, other modes may be adopted such that, for example, using thermistors or thermostats instead of this steam sensing elements, each of which are disposed opposite to the opening of the steam pipe 54 or 130, thereby to sense steam spouting from the above-said opening and by configurating to operate so as to open the hot water supply valve 38 or 100 by a driving source such as an electromagnetic valve and timer operating simulatneously and in association with the steam sensing element.

As apparent from the above description on the embodiments, a coffee kettle according to this invention comprises a filter case for containing coffee powder, a water tank provided with a heater, a power supply switch for the above-mentioned heater, a steam sensing element to operate upon sensing steam generated from water heated to boil in the above-said water tank, and a hot water supply valve for supplying hot water in the water tank to the filter case in association with the steam sensing element, and accordingly, since hot water to be supplied to coffee powder is necessarily made boiling one and, a temperature of hot water to be in contact with coffee powder is made high from the beginning, coffee powder is swollen as fully as providing a state permitting easy extraction of coffee essence extraction, and as a result, the extraction operation is completed within 3 to 4 minutes, whereby a coffee essence is efficiently extracted satisfying a requirement as a key to extraction of coffee essence for serving tasty liquid, and genuinely flavorful and rich coffee liquid can be served.

Furthermore, since a temperature of hot water is sensed without fail as to whether boiling or not before poured onto coffee powder and, as a result, free from fluctuation which may otherwise be caused according to the number of servings, electric power consumption, and sensitivity change in repeated use, hot water at the boiling point is stably supplied any time and a high reliability in quality to serve tasty coffee liquid is always ensured.

Because of the application of boiling water to coffee essence extraction, even hard water is softened to be tasty and bad smell of chlorinated lime is removed so as not to affect the taste of coffee.

Further, since steam sensing is the performance of sensing quick change from the normal temperature of water to the boiling point thereof, it gives a tolerance in setting of a temperature and can eliminate sensing error caused by the divergence, and therefore, high reliability and decreasing of production cost becomes possible.

Further, this invention is excellent in respect of safety and operability because automatic operation is possible with the knob alone operated and opening of the power supply switch can be performed in association with the movement of the steam sensing element.

We claim:

1. A coffee kettle, comprising: a filter case for containing coffee powder, a water tank having a heater, power supply and control means for supplying electric power to said heater, a steam sensing element communicated with said water tank and adapted to operate while sensing steam generated when water in said water tank is heated to boiling, and a conduit for communicating said filter case with said water tank, said conduit having interposed therein a hot water supply valve for opening to supply hot water from the water tank to said filter case in association with operation of said steam sensing element.

2. A coffee kettle as set forth in claim 1, wherein:
said power supply and control means for supplying electric power to said heater is arranged to interrupt supplying electric power to said heater in association with operation of said steam sensing element.

3. A coffee kettle as set forth in claim 1, wherein:
said power supply and control means for supplying electric power to said heater is adapted for, once in a coffee beverage-making cycle, interrupting hot water supply to the filter case for an interval of time, by controlling the hot water supply valve for providing a pause between when coffee powder contained in said filter case is dampened, and when a desired amount of coffee beverage is made.

4. A coffee kettle as set forth in claim 3, wherein:
said power supply and control means for supplying electric power to said heater comprises an operation part which is accessible from externally of said coffee kettle for variably setting the duration of said interval of time.

5. A coffee kettle as set forth in any one of claims 1 through 4, wherein:
said steam sensing element includes a steam sensor made of a shape memory alloy.

6. Appartus for brewing a hot coffee beverage, comprising:
a filter support chamber adapted to support a supply of initially-dry ground coffee on a filter, to receive through an inlet thereof located upstream of said supply of ground coffee heated water for infusing said supply of ground coffee, and to deliver through an outlet thereof a hot coffee beverage;
a water heating chamber served by an electrically-powered hot water heater, this chamber having an inlet for receiving water to be heated, and an outlet means operatively connected with said inlet of said filter support chamber for delivering heated water from said water heating chamber to said filter support chamber for infusing said supply of ground coffee; said water heating chamber being adapted to receive a supply of water through said inlet thereof for filling said water heating chamber to a level which provides a headspace within said water heating chamber;

an openable/closable valve incorporated in said outlet means of said water heating chamber;

a steam sensor;

inlet means communicating said steam sensor with said headspace of said water heating chamber;

valve actuator means operatively communicating said steam sensor to said valve for opening said valve, at least for a limited time, when steam is sensed by said steam sensor via said inlet means.

7. The apparatus of claim 6, further including:

a heater switch for said electrically-powered hot water heater; and means operatively at least indirectly connecting said heater switch with said steam sensor, so that electrical energy supply to said hot water heater is reduced when said valve is temporarily opened a first time and is raised when said valve is closed after having been temporarily opened a first time;

control means for said valve actuator means, this control means being arranged for:
(a) temporarily opening said valve only briefly a first time when steam is sensed by said steam sensor via said inlet means, for delivering to said inlet of said filter support chamber enough nearly-boiling water to substantially fully dampen said supply of initially-dry ground coffee so that said supply of ground coffee swells, but little hot coffee beverage drains therefrom, whereupon said valve is temporarily closed; and
(b) opening said valve a second time when steam is again sensed by said steam sensor via said inlet means, for delivering to said inlet of said filter support chamber enough nearly-boiling water to cause a substantial amount of hot coffee beverage to drain from said dampened, swelled supply of ground coffee.

* * * * *